(12) United States Patent
Shimaguchi

(10) Patent No.: US 6,907,801 B2
(45) Date of Patent: Jun. 21, 2005

(54) AUTOMATIC TRANSMISSION

(75) Inventor: Hiromichi Shimaguchi, Shizuoka-ken (JP)

(73) Assignee: Suzuki Motor Corporation, Shizuoka-ken (JP)

(*) Notice: Subject to any disclaimer, the term of this patent is extended or adjusted under 35 U.S.C. 154(b) by 32 days.

(21) Appl. No.: 10/400,048

(22) Filed: Mar. 26, 2003

(65) Prior Publication Data

US 2003/0183029 A1 Oct. 2, 2003

(30) Foreign Application Priority Data

Mar. 27, 2002 (JP) .......................... 2002-088407

(51) Int. Cl.[7] .............................. F16H 3/08
(52) U.S. Cl. ...................... 74/329; 74/331; 74/333
(58) Field of Search ...................... 74/329, 331, 333

(56) References Cited

U.S. PATENT DOCUMENTS

| | | | |
|---|---|---|---|
| 5,383,375 A | * 1/1995 | Ogawa et al. | ............ 74/331 X |
| 5,392,665 A | * 2/1995 | Muller | ............ 74/333 X |
| 6,044,719 A | 4/2000 | Reed, Jr. et al. | |
| 6,494,110 B2 | 12/2002 | Hatakeyama | |
| 6,516,261 B2 | * 2/2003 | Ohashi et al. | ............... 701/51 |
| 2001/0013258 A1 | 8/2001 | Kobayashi | |

FOREIGN PATENT DOCUMENTS

| | | | |
|---|---|---|---|
| DE | 19607932 | * | 9/1996 |
| JP | 05-248527 | | 9/1993 |
| JP | 05-96617 U | | 12/1993 |
| JP | 06-201027 | | 7/1994 |
| JP | 2703169 B2 | | 10/1997 |
| JP | 3011567 B2 | | 12/1999 |
| JP | 2000-097297 | | 4/2000 |
| JP | 2001-227599 | | 8/2001 |
| JP | 2001-227600 | | 8/2001 |
| JP | 2001-280495 | | 10/2001 |
| JP | 2001-289288 | | 10/2001 |

* cited by examiner

Primary Examiner—Ha Ho
(74) Attorney, Agent, or Firm—Flynn, Thiel, Boutell & Tanis, P.C.

(57) ABSTRACT

An automatic transmission having input and output shafts, a plurality of gear trains, a shift mechanism, and a sub clutch. An actuator operates the shift mechanism to shift the gear trains according to a driving state of the vehicle. The sub clutch transmits the driving force from the input shaft to the output shaft during gearshift. The driving force transmitting path in which the sub clutch is disposed, forms a third speed gear train that is the third gear counted from the gear having the maximum speed ratio. The sub clutch functions as a third speed shift mechanism for the third speed gear train.

14 Claims, 16 Drawing Sheets

OPERATION OF GEARSHIFT FROM 4th TO 5th SPEED

| | BEFORE GEARSHIFT | GEARSHIFT STARTS | DURING GEARSHIFT | | |
|---|---|---|---|---|---|
| PRIOR ART #1 (ACCELERATION TORQUE) | 3rd/4th SLEEVE IN 4th SPEED POSITION → (4th SPEED TORQUE) | CLUTCH DISCONNECTED | 3rd/4th SLEEVE IN NEUTRAL POSITION → (NO ACCELERATION TORQUE) | → | 5th SLEEVE PRESSED AGAINST 5th SPEED ↑ |
| PRIOR ART #2 (ACCELERATION TORQUE) | 3rd/4th SLEEVE IN 4th SPEED POSITION → (4th SPEED TORQUE) | TORQUE IS DISTRIBUTED TO SUB CLUTCH | 3rd/4th SLEEVE IN NEUTRAL POSITION → (5th SPEED TORQUE) | → | START SYNCHRONIZATION WITH 5th SPEED BY SUB CLUTCH ↑ |
| PRESENT INVENTION (ACCELERATION TORQUE) | 4th/5th SLEEVE IN 4th SPEED POSITION → (4th SPEED TORQUE) | CLUTCH DISCONNECTED | 4th/5th SLEEVE IN NEUTRAL POSITION → (NO ACCELERATION TORQUE) | → | 4th/5th SLEEVE PRESSED AGAINST 5th SPEED ↑ |

| DURING GEARSHIFT | | | GEARSHIFT FINISHED |
|---|---|---|---|
| FINISH SYNCHRONIZATION WITH 5th SPEED | → | 5th SLEEVE IN 5th SPEED POSITION ↑ (NO ACCELERATION TORQUE) | CLUTCH ENGAGED ↑ (5th SPEED TORQUE) |
| FINISH SYNCHRONIZATION WITH 5th SPEED | → | 5th SLEEVE IN 5th SPEED POSITION ↑ (5th SPEED TORQUE) | SUB CLUTCH ENGAGED ↑ |
| FINISH SYNCHRONIZATION WITH 5th SPEED | → | 4th/5th SLEEVE IN 5th SPEED POSITION ↑ (NO ACCELERATION TORQUE) | CLUTCH ENGAGED ↑ (5th SPEED TORQUE) |

FIG. 10

OPERATION OF GEARSHIFT FROM 4th TO 3rd SPEED (BY KICKDOWN)

| | BEFORE GEARSHIFT | GEARSHIFT STARTS | DURING GEARSHIFT | |
|---|---|---|---|---|
| PRIOR ART #1 (ACCELERATION TORQUE) | 3rd/4th SLEEVE IN 4th SPEED POSITION → | CLUTCH DISCONNECTED → | 3rd/4th SLEEVE IN NEUTRAL POSITION → | 3rd/4th SLEEVE PRESSED AGAINST 3rd SPEED ↑ |
| | (4th SPEED TORQUE) | | (NO ACCELERATION TORQUE) | |
| PRIOR ART #2 (ACCELERATION TORQUE) | 3rd/4th SLEEVE IN 4th SPEED POSITION → | CLUTCH DISCONNECTED → | 3rd/4th SLEEVE IN NEUTRAL POSITION → | 3rd/4th SLEEVE PRESSED AGAINST 3rd SPEED ↑ |
| | (4th SPEED TORQUE) | | (NO ACCELERATION TORQUE) | |
| PRESENT INVENTION (ACCELERATION TORQUE) | 4th/5th SLEEVE IN 4th SPEED POSITION → | CLUTCH DISCONNECTED → | 4th/5th SLEEVE IN NEUTRAL POSITION → | CLUTCH ENGAGED ↑ |
| | (4th SPEED TORQUE) | | (NO ACCELERATION TORQUE) | |

| DURING GEARSHIFT | | | GEARSHIFT FINISHED |
|---|---|---|---|
| FINISH SYNCHRONIZATION WITH 3rd SPEED → | 3rd/4th SLEEVE IN 3rd SPEED POSITION → | ↑ | CLUTCH ENGAGED |
| | (NO ACCELERATION TORQUE) | | (3rd SPEED TORQUE) |
| FINISH SYNCHRONIZATION WITH 3rd SPEED → | 3rd/4th SLEEVE IN 3rd SPEED POSITION → | ↑ | CLUTCH ENGAGED |
| | (NO ACCELERATION TORQUE) | | (3rd SPEED TORQUE) |
| SYNCHRONIZATION WITH 3rd SPEED BY SUB CLUTCH → | FINISH SYNCHRONIZATION WITH 3rd SPEED → | ↑ | SUB CLUTCH ENGAGED |
| | (3rd SPEED TORQUE) | | |

FIG.12

OPERATION OF GEARSHIFT FROM 4th TO 2nd SPEED (BY KICKDOWN)

| | BEFORE GEARSHIFT | GEARSHIFT STARTS | DURING GEARSHIFT | | |
|---|---|---|---|---|---|
| PRIOR ART #1 (ACCELERATION TORQUE) | 3rd/4th SLEEVE IN 4th SPEED POSITION (4th SPEED TORQUE) | → CLUTCH DISCONNECTED | → 3rd/4th SLEEVE IN NEUTRAL POSITION (NO ACCELERATION TORQUE) | → | 1st/2nd SLEEVE PRESSED AGAINST 2nd SPEED |
| PRIOR ART #2 (ACCELERATION TORQUE) | 3rd/4th SLEEVE IN 4th SPEED POSITION (4th SPEED TORQUE) | → CLUTCH DISCONNECTED | → 3rd/4th SLEEVE IN NEUTRAL POSITION (NO ACCELERATION TORQUE) | → | 1st/2nd SLEEVE PRESSED AGAINST 2nd SPEED |
| PRESENT INVENTION (ACCELERATION TORQUE) | 4th/5th SLEEVE IN 4th SPEED POSITION (4th SPEED TORQUE) | → CLUTCH DISCONNECTED | → 4th/5th SLEEVE IN NEUTRAL POSITION (NO ACCELERATION TORQUE) | → | CLUTCH ENGAGED |

| DURING GEARSHIFT | | | GEARSHIFT FINISHED |
|---|---|---|---|
| FINISH SYNCHRONIZATION WITH 2nd SPEED | → 1st/2nd SLEEVE IN 2nd SPEED POSITION (NO ACCELERATION TORQUE) | → | CLUTCH ENGAGED (2nd SPEED TORQUE) |
| FINISH SYNCHRONIZATION WITH 2nd SPEED | → 1st/2nd SLEEVE IN 2nd SPEED POSITION (NO ACCELERATION TORQUE) | → | CLUTCH ENGAGED (2nd SPEED TORQUE) |
| SYNCHRONIZATION WITH 2nd SPEED BY SUB CLUTCH (3rd SPEED TORQUE) | → FINISH SYNCHRONIZATION WITH 2nd SPEED | → 1st/2nd SLEEVE IN 2nd SPEED POSITION | SUB CLUTCH DISENGAGED (2nd SPEED TORQUE) |

FIG.14

PRIOR ART

AUTOMATIC TRANSMISSION

FIELD OF THE INVENTION

This invention relates to automatic transmissions for a vehicle and, more particularly, to an automatic transmission capable of maintaining acceleration torque during gearshifts from first to second speed and from second to third speed without a detectable gear shock or an uncomfortable feeling.

BACKGROUND OF THE INVENTION

Vehicles include transmissions to convert and transmit driving force produced by engines according to a driving state of the vehicle. The transmissions include manual transmissions in which a plurality of gear trains are shifted by manual operation, and automatic transmissions in which the gear trains are shifted automatically according to a driving state.

In the manual transmission that is equipped with gear trains and a shift mechanism, the shift mechanism is operated manually to change to one of the gear trains. The automatic transmission, on the other hand, is equipped with a torque converter and an auxiliary transmission in which gears are automatically shifted by an actuator according to the driving state.

In the automatic transmission with the torque converter, the torque converter is used while the vehicle is started and traveling, and the gear is shifted by a clutch. The torque converter on the automatic transmission, however, has low efficiency of drive force transmission and a large capacity oil pump is provided to supply oil pressure to a clutch transmission, and to the torque converter. As a result, loss of the driving force increases fuel consumption.

To eliminate the aforesaid problem, an automatic transmission is provided which is based on the manual transmission including gear trains and shift mechanism and which automatically shifts the gear trains by the actuator.

One example of the automatic transmission based on the manual transmission is shown in FIG. 16. In FIG. 16, reference numeral 202 designates an engine, and 204 the automatic transmission. The automatic transmission 204 includes: an input shaft 210 connected to a crankshaft 206 of the engine 202 through a clutch 208; an output shaft 212; gear trains 214, 216, 218, 220, 222 and a reverse gear train 224; synchronizer-type shift mechanisms 226, 228, 230; a reverse shift mechanism 232; a final gear 234; a differential 236; and a drive shaft 238. The drive shaft 238 is connected to drive wheels (not shown) of the vehicle.

In the automatic transmission 204, an automatic gearshift device (not shown) automatically changes the gear trains 214, 216, 218, 220, 222. During gearshift, an actuator (not shown) operates to start the clutch 208, the 1st/2nd shift mechanism 226, the 3rd/4th shift mechanism 228, the 5th shift mechanism 230, and the reverse shift mechanism 232 so that the gear trains 214, 216, 218, 220, 222 and 224 are shifted according to a driving state of the vehicle.

In the automatic transmission 204 based on the manual transmission, the clutch 208 is to be disengaged during gearshift from first to second speed with engagement of gear being shifted from the first speed gear train 214 to the second gear train 216, and during gearshift from second to third speed with engagement of gear being shifted from the second speed gear train 216 to the third speed gear train 218. This disengagement of the clutch 208 results in disconnection of acceleration torque to the output shaft.

Another example of an automatic transmission based on the manual transmission to deal with this problem is disclosed in Japanese Patent No. 2703169. The automatic transmission is provided with a sub or secondary clutch which can variably control transmitted torque and which is disposed on a torque transmission path defined by a gear train having a minimum transmission gear ratio between the input and output shafts. During gearshift, the sub clutch transmits driving force from the input shaft to the output shaft. Thereby, disconnection of the acceleration torque to the output shaft can be prevented.

An automatic transmission equipped with such a sub clutch is also disclosed in JP Laid-Open No. 2001-227599. This automatic transmission is provided with a sub clutch which can variably control transmitted torque and which is disposed on a torque transmission path defined by gear trains corresponding to third to fourth speed between input and output shafts. The sub clutch transmits driving force from the input shaft to the output shaft during gearshift so as to prevent the disconnection of the acceleration torque.

Referring to dashed lines in FIGS. 3, 5, 7, 9, in the automatic transmission of the first example (i.e. FIG. 16), the clutch 208 is disengaged during each gearshift of 1st to 2nd, 2nd to 3rd, 3rd to 4th, and 4th to 5th speeds. Then after completion of synchronization of each shift mechanism 226, 228, 230; each shift sleeve 240, 242, 244 is engaged with the respective selected next gear, and then the clutch 208 is engaged. As a result, the acceleration torque during acceleration is disengaged or disconnected according to the first example of the automatic transmission. In particular, the acceleration torque is reduced or drops considerably during the gearshifts from 1st to 2nd speeds and from 2nd to 3rd speeds. The larger the drop in acceleration torque, the larger the increase of time for proper synchronization, resulting in noticeable disengagement or disconnection of the acceleration torque, and detectable uncomfortable feeling during the gearshift.

In contrast, referring to dot-dash and dashed lines in FIGS. 3, 5, 7, 9, in the automatic transmission of the second example, during each gearshift of 1st to 2nd, 2nd to 3rd, 3rd to 4th, and 4th to 5th speeds, the clutch 208 is not disengaged and maintains transmitting of the driving force from the input shaft to the output shaft. Then after completion of synchronization, each sleeve of the shift mechanism is engaged with the respective selected next gear. As a result, the acceleration torque during acceleration is not disengaged according to the second example of the automatic transmission. In this second example of the automatic transmission, however, the sub clutch to maintain the acceleration torque during gearshift is disposed in the gear train having minimum gear transmission ratio, which results in a lower acceleration torque maintained by the sub clutch.

In the automatic transmission of the second example, the acceleration torque drops considerably, since the acceleration torque maintained is small, in particular during gearshift from 1st to 2nd speed, which has the large gear transmission ratio and the largest acceleration torque, and from 2nd to 3rd speed. This does not distinguish from the first example with regards to driver's uncomfortable feeling owing to reduction of the acceleration torque during the gearshift.

In addition, the automatic transmission of the second example does not change the constitution of the automatic transmission 204 of the first example shown in FIG. 16 having the gear trains 214, 216, 218, 220, 224 and the shift mechanisms 226, 228, 230, 232, except for the additional sub clutch. This increases the number of components, i.e., the additional sub clutch, and increases cost.

The automatic transmission disclosed in above-mentioned JP Laid-Open No. 2001-227599 includes a gear train corresponding to the gear transmission ratio from 3rd to 4th speed dedicated to the sub clutch. However, the automatic transmission does not change the constitution of the automatic transmission 204 of the first example shown in FIG. 16, except for the additional sub clutch and an intermediate shaft for the sub clutch, and input and output gears to transmit the driving force by the sub clutch. This increases the number of components and increases cost.

SUMMARY OF THE INVENTION

To obviate or minimize the above inconvenience, the present invention provides an automatic transmission having an input shaft that receives driving force from an engine mounted on a vehicle through a clutch, and an output shaft in parallel with the input shaft for outputting the shifted driving force to drive wheels. A plurality of gear trains convert the driving force of the input shaft at different ratios and transmits force to the output shaft. A shift mechanism switches the gear trains. A sub clutch variably controls the transmitted torque, with the sub clutch being disposed on a driving force transmitting path between the input and output shafts. An actuator operates the shift mechanism to shift the gear trains according to a driving state of the vehicle. The sub clutch transmits the driving force from the input shaft to the output shaft during gearshift. The driving force transmitting path on which the sub clutch is disposed, forms a third speed gear train that is the third gear counted from the gear having the maximum speed ratio. The sub clutch functions as a third speed shift mechanism for the third speed gear train.

According to the present invention, the sub clutch maintains the acceleration torque during gearshift, so that the maintained torque has greater force to prevent the large fall of the torque. The disengagement or disconnection of the acceleration torque is eliminated so as to reduce shifting time, and an additional third speed shift mechanism dedicated to the third speed gear train can also be eliminated. The gearshift is achievable while maintaining the acceleration torque of the third speed even during gearshift by kickdown.

BRIEF DESCRIPTION OF THE DRAWINGS

FIG. 10 is an explanatory drawing illustrating operations during gearshift from fourth to fifth speed.

FIG. 12 is an explanatory drawing illustrating operations during gearshift from fourth to third speed by kickdown.

FIG. 14 is an explanatory drawing illustrating operations during gearshift from fourth to second speed by kickdown.

DETAILED DESCRIPTION OF THE INVENTION

The invention will be described with reference to FIGS. 1–15 which illustrate an embodiment of this invention.

Figure 1:
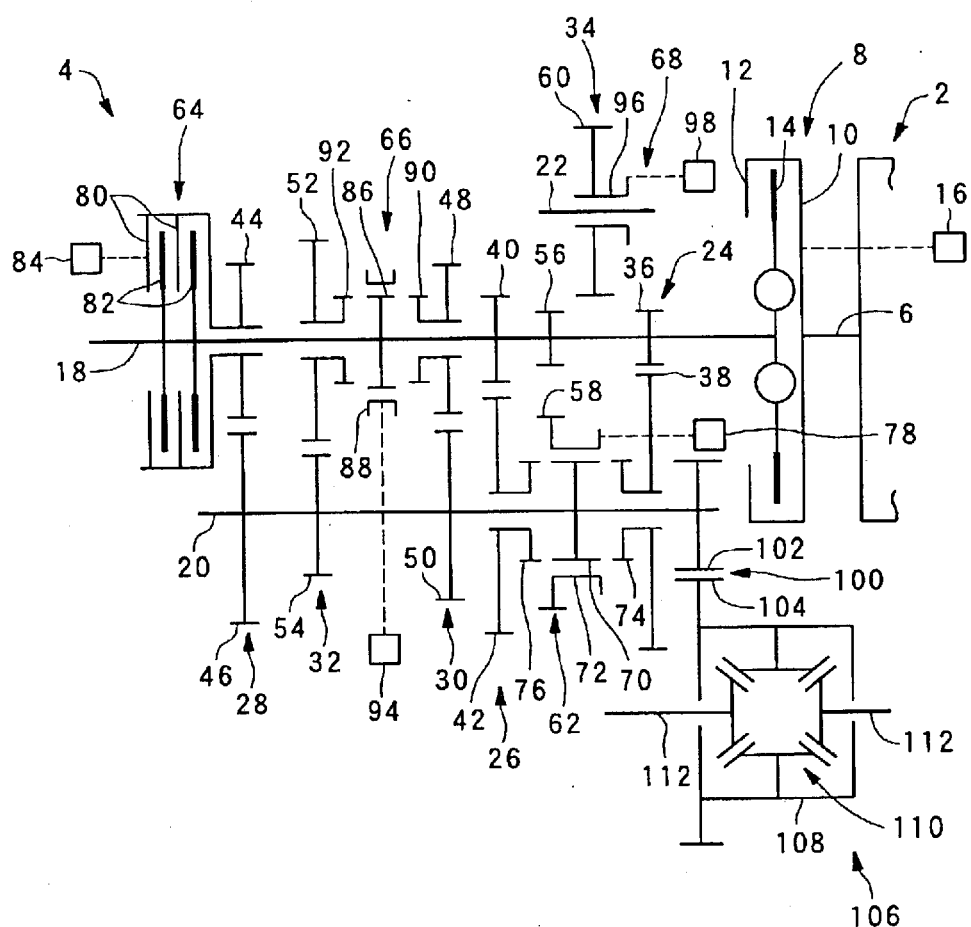
FIG. 1 is a schematic diagram illustrating an embodiment of an automatic transmission according to the present invention.

FIG. 1 shows an engine 2 disposed on a vehicle (not shown), an automatic transmission 4, and a clutch 8 at an output end of an engine crankshaft 6 to connect with the automatic transmission 4. The clutch 8 includes a pressure plate 12 attached to a flywheel 10 connected with the crankshaft 6, and a clutch disk 14 between the flywheel 10 and the pressure plate 12. An actuator 16 for the clutch 8 operates to connect and disconnect the pressure plate 12 with the clutch disk 14.

The automatic transmission 4 includes an input shaft 18 to which driving force from the engine 2 is input through the clutch 8, an output shaft 20 substantially in parallel with the input shaft 18 to output the driving force to vehicle drive wheels (not shown), and a reverse idler shaft 22 substantially in parallel with the input and output shafts 18, 20. The input shaft 18 is, at an input end thereof, non-rotatably connected to the clutch disk 14.

The automatic transmission 4 also includes a plurality of forward gear trains 24, 26, 28, 30, 32 and a reverse gear train 34 to convert the driving force of the input shaft 18 at different speed ratios and to transmit the driving force to the output shaft 20.

More particularly, the first gear train 24 includes a first speed input (drive) gear 36 fixed to the input shaft 18 at the end thereof toward the engine 2, and a first speed output (driven) gear 38 rotatably supported by the output shaft 20 and in mesh with the gear 36. The second gear train 26 includes a second speed input (drive) gear 40 fixed to the input shaft 18 adjacent to the first speed input gear 36, and a second speed output (driven) gear 42 rotatably supported by the output shaft 20 and in mesh with the gear 40.

The third speed gear train 28 includes a third speed input (or drive) gear 44 rotatably supported by the input shaft 18 at a position spaced longitudinally away from the engine 2 and next to a fifth speed input gear 52 mentioned later, and a third speed output (or driven) gear 46 in mesh with the gear 44 and fixed to the output shaft 20.

The fourth gear train 30 includes a fourth speed input (or drive) gear 48 rotatably supported by the input shaft 18 at a position spaced longitudinally away from the engine 2 next to the second speed input gear 40, and a fourth speed output (or driven) gear 50 in mesh with the gear 48 and fixed to the output shaft 20. The fifth gear train 32 includes the fifth speed input (drive) gear 52 rotatably supported by the input shaft 18 at a position spaced away from the engine 2 and axially between the fourth speed input gear 40 and the third speed input gear 44, and a fifth speed output (driven) gear 54 in mesh with the gear 52 and fixed to the output shaft 20.

The reverse gear train 34 includes a reverse input (drive) gear 56 fixed to the input shaft 18 axially between the gears 36 and 40, a reverse output gear 58 nonrotatably attached to a 1st/2nd sleeve 72 of a 1st/2nd shift mechanism 62, and a reverse idler gear 60 axially movable and rotatably supported by the reverse idler shaft 22 to engage and disengage the reverse gears 56 and 58.

Thereby, the input shaft 18 is provided with, axially from the engine side or end, the first speed input gear 36, the reverse input gear 56, the second speed input gear 40, the fourth speed input gear 48, the fifth speed input gear 52, and the third speed input gear 44. The output shaft 20 is provided with, axially from the engine side, the first speed output gear 38, the reverse output gear 58, the second speed output gear 42, the fourth speed output gear 50, the fifth speed output gear 54, and the third speed output gear 46.

To shift the forward gear trains 24, 26, 28, 30, 32 and the reverse gear train 34, the automatic transmission 4 includes a 1st/2nd shift mechanism 62, a sub or secondary clutch 64, a 4th/5th shift mechanism 66, and reverse shift mechanism 68. The synchronizer-type 1st/2nd shift mechanism 62 is disposed around the output shaft 20 between the first and second speed output gears 38 and 42. The sub clutch 64 is disposed at an end of the input shaft 18 which is remote or spaced away from the engine 2 so as to be positioned next to the third speed input gear 44, and functions as a synchronizer-type 3rd shift mechanism for the third speed gear train 28. The synchronizer-type 4th/5th shift mechanism 66 is disposed around the input shaft 18 between the fourth and fifth speed input gears 48 and 52. The reverse shift mechanism 68 is attached to the reverse idler gear 60.

The 1st/2nd shift mechanism 62 includes a 1st/2nd shift sleeve 72 which is axially movable but non-rotatably mounted on a 1st/2nd shift hub 70 fixed to the output shaft 20. The first and second output gears 38, 42 are provided with first and second engaging portions 74, 76 respectively. Between the 1st/2nd sleeve 72 and the engaging portions 74 and 76, a conventional synchronizer device is mounted (not shown). An actuator 78 for 1st/2nd speed shift operates the 1st/2nd sleeve 72, and rotational speed is synchronized by the synchronizer device in a conventional manner. The sleeve 72 is shifted axially so as to be selectively engaged and disengaged with the engaging portions 74, 76 so as to achieve the gearshift between the first and second speeds.

The reverse output gear 58 is integrated into the shift sleeve 72.

The driving force transmitting path on which the sub clutch 64 is disposed, forms the third gear train 28 that is the third gear ratio counted from the gear train having the maximum gear ratio, i.e. the first gear train 24. The sub clutch 64 also functions as the synchronizer-type 3rd shift mechanism for the third speed gear train 28.

The sub clutch 64 includes a plurality of pressure plates 80 nonrotatably coupled to the third speed input gear 44 which is rotatably supported by the input shaft 18. A plurality of clutch disks 82 are nonrotatably mounted to the input shaft 18 alternately with the pressure plates 80. The sub clutch 64 has the clutch disks 82 abutted and released from the pressure plates 80 by an actuator 84 for the sub clutch 64 for engagement and disengagement to achieve gearshift to the third speed.

The 4th/5th shift mechanism 66 includes a 4th/5th shift sleeve 88 axially movable but nonrotatably mounted on a 4th/5th shift hub 86 fixed to the input shaft 18. The fourth and fifth input gears 48, 52 are provided with fourth and fifth engaging portions 90, 92 respectively. Between the 4th/5th sleeve 88 and the engaging portions 90 and 92, a conventional synchronizer device is mounted (not shown). An actuator 94 for 4th/5th speed operates the 4th/5th sleeve 88, and rotational speed is synchronized in a conventional manner by the synchronizer device. The 4th/5th shift sleeve 88 is selectively engaged and disengaged with the engaging portions 90, 92 so as to achieve the gearshift between the fourth and fifth speeds.

The reverse shift mechanism 68 has a reverse sleeve 96 integrated into the reverse idler gear 60. An actuator 98 for reverse operates the reverse sleeve 96 to be engaged and disengaged with the reverse input gear 56 and the reverse output gear 58.

In the automatic transmission 4, the output shaft 20 has, at an end toward the engine 2, a final drive gear 102 defining a final drive gear train 100. A final driven gear 104 in mesh with the final drive gear 102 is disposed in a differential case 108 of a differential 106. The differential 106 includes in the differential case 108 a differential gear train 110 to which one ends of right and left drive shafts 112 are connected. The other ends of the drive shafts 112 are connected to drive wheels (not shown).

Figure 2:
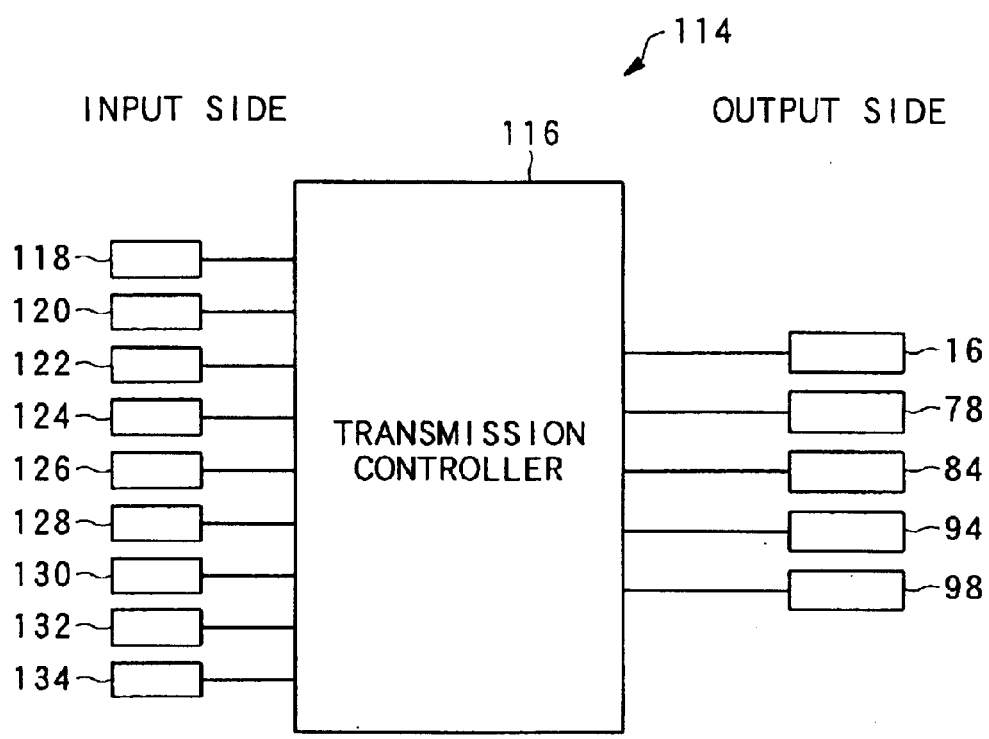
FIG. 2 is a block diagram illustrating the actuators, controller, and sensors of the automatic gearshift device of the automatic transmission.

Referring to FIG. 2, a controller 116 of an automatic gearshift device 114 is connected to the actuator 16 for the main clutch 8, the actuator 78 for 1st/2nd speed, the actuator 84 for the sub clutch 64, the actuator 94 for 4th/5th speed, and the actuator 98 for reverse.

The controller 116 is also connected to a vehicle speed sensor 118, an engine speed sensor 120, a throttle opening degree sensor 122, an accelerator pedal sensor 124, a brake switch 126, a shift position sensor 128 to detect the position of a shift lever (not shown) for the automatic transmission 4, input and output shafts rotating speed sensors 130 and 132, a clutch sensor 134 to detect whether the clutch 8 is connected or disconnected, and the like.

In the automatic gearshift device 114, the controller 116 receives signals from the sensors 118, 120, 122, 124, 126, 128, 130, 134, and transmits or outputs signals to the actuators 16, 78, 84, 94, 98 to operate the clutch 8, the 1st/2nd shift mechanism 62, the sub clutch 64, the 4th/5th shift mechanism 66, and the reverse shift mechanism 68 respectively.

The automatic transmission 4 has the 1st/2nd shift mechanism 62, the sub clutch 64, the 4th/5th shift mechanism 66, and the reverse shift mechanism 68 each operated by the actuators 78, 84, 94, 98. The forward gear trains 24, 26, 28, 30, 32 and the reverse gear train 34 are shifted to first to fifth speed or to reverse according to the driving state of the vehicle. During gearshift, the sub clutch 64 is operated by the actuator 84, and engages or disengages to control the driving force from the input shaft 18 to the output shaft 20.

In the automatic transmission 4, the driving force transmitting path on which the sub clutch 64 is disposed, forms the third gear train 28 that is the third gear ratio counted from the first gear train 24, the latter having the maximum ratio of the gear trains 24, 26, 28, 30, 32. That is, the first gear train 24 defines the largest speed or gear ratio from the input shaft to the output shaft, whereas the second, third, fourth and fifth gear trains define speed or gear ratios which respectively progressively step down from the ratio of the first gear train, as is conventional in vehicle transmissions. The sub clutch 64 also functions as the synchronizer-type 3rd shift mechanism for the third speed gear train 28 that is the third speed or gear ratio counted from the first gear train having the maximum ratio.

Also in the automatic transmission 4, the 1st/2nd shift mechanism 62 to shift the first and second speed gear trains 24, 26 is disposed between the first gear train 24, which is the first gear, and the second gear train 26, which is the second gear, counted from the first gear having the maximum gear ratio of the gear trains 24, 26, 28, 30, 32. The 4th/5th shift mechanism 66 shifts the fourth and fifth speed gear trains 30, 32 and is disposed between the fourth gear train 30, which is the fourth gear, and the fifth gear train 32, which is the fifth gear counted from the first gear having the maximum gear ratio of the gear trains.

Next, an explanation will be given as to the operation of the above described embodiment.

In the vehicle (not shown), the automatic transmission 4 which is based on a manual transmission, is connected to the engine 2 through the clutch 8, which transmission includes the gear trains 24, 26, 28, 30, 32, 34, the 1st/2nd shift mechanism 62, the sub clutch 64, the 4th/5th shift mechanism 66, and the reverse shift mechanism 68.

In the automatic transmission 4, the automatic gearshift device 114 controls the actuators 16, 78, 84, 94, 98 to operate the shift mechanisms 62, 66, 68 and the sub clutch 64 to achieve gearshift to any one of the selected first to fifth speeds or the reverse position according to the driving state of the vehicle.

Figure 4:
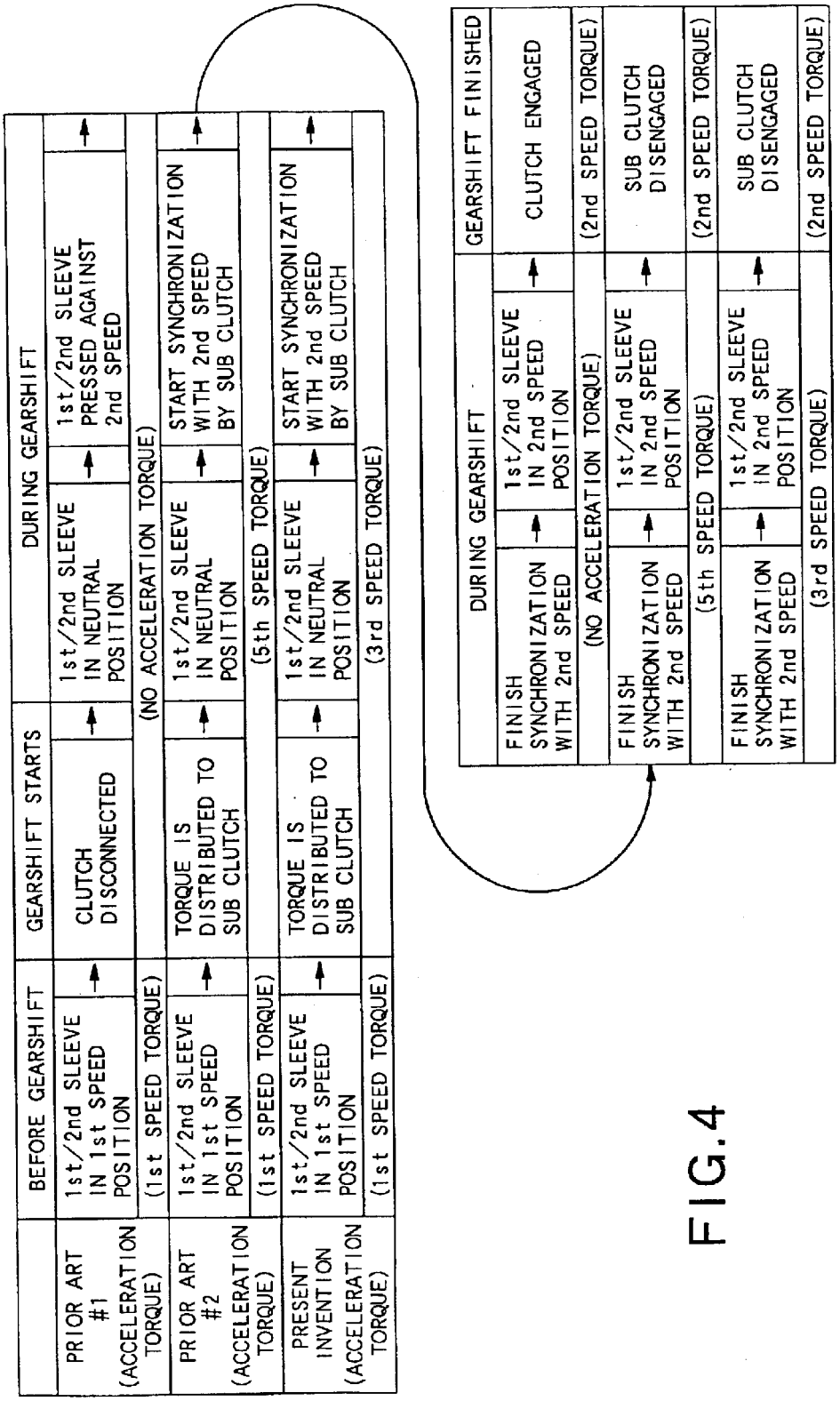
FIG. 4, is an explanatory drawing illustrating operations during gearshift from first to second speed.

As shown in FIG. 4, during gearshift from first to second speed, the main clutch 8 has been engaged. During operation in the first speed before the gearshift, the 1st/2nd shift sleeve 72 is engaged with the 1st engaging portion 74 associated with the first drive gear 38. At the beginning of the gearshift, the sub clutch 64 is engaged to permit the torque that is transmitted from the input shaft 18 to the output shaft 20 to be distributed to the sub clutch 64. During the gearshift, the 1st/2nd shift sleeve 72 is moved to a neutral position, and the sub clutch 64 shares the torque corresponding to the second speed, and then the synchronization starts. After finishing the synchronization with the second speed, the 1st/2nd shift sleeve 72 is engaged with the 2nd engaging portion 76 associated with the second driving gear 42 to complete the gearshift into the second speed, whereupon the sub clutch 64 is disengaged and gearshift operation is finished.

As described, during the gearshift from the first to second speed, the main clutch 8 is engaged. The acceleration torque before the gearshift is the first speed torque, and the acceleration torque during the gearshift is that corresponding to the third speed torque outputted by the sub clutch 64, and the acceleration torque after finishing the gearshift is the second speed torque.

Figure 3:
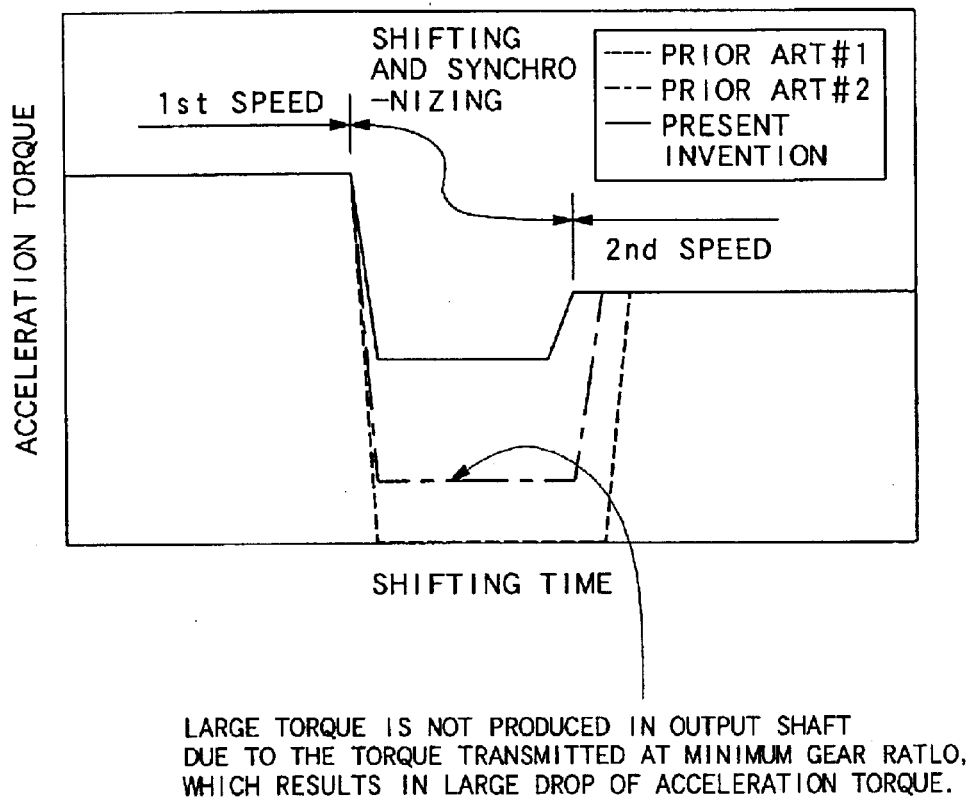
FIG. 3 is a timing chart during gearshift from first to second speed.

Accordingly, as shown by a solid line in FIG. 3, the sub clutch 64 maintains an acceleration torque corresponding to third speed during gearshift from first speed to second speed, to prevent a large decrease or fall-off of torque at the output shaft. The disconnection of the acceleration torque during shifting is thus eliminated, thereby reducing shifting time.

Figure 6:
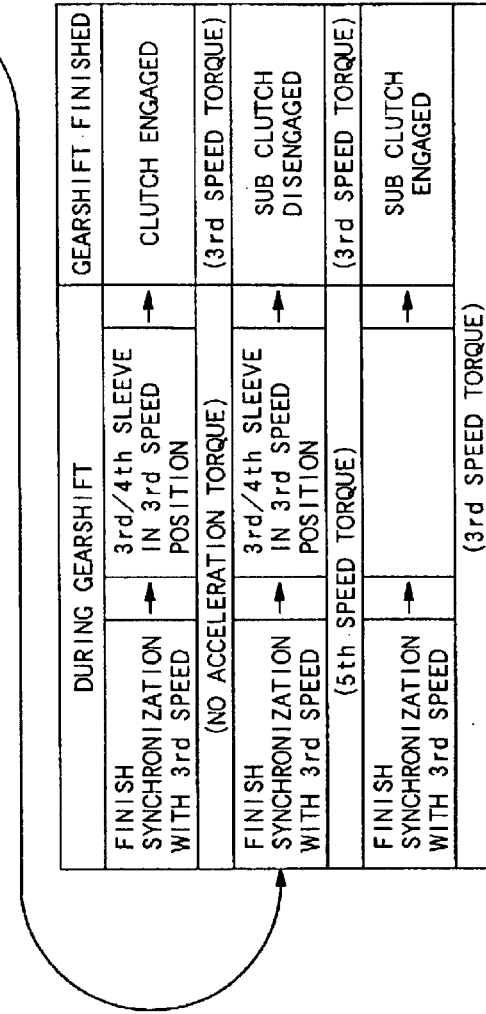
FIG. 6 is an explanatory drawing illustrating operations during gearshift from second to third speed.

In addition, as shown in FIG. 6, during gearshift from second to third speed, the main clutch 8 has been engaged. During operation in the second speed before the gearshift, the 1st/2nd sleeve 72 is engaged with the 2nd engaging portion 76. At the beginning of the gearshift, the sub clutch 64 is engaged to permit the torque that is transmitted from the input shaft 18 to the output shaft 20 to be distributed to the sub clutch 64. During the gearshift, the 1st/2nd shift sleeve 72 is moved to a neutral position, and the sub clutch 64 shares the torque corresponding to the third speed, and then the synchronization starts. Simultaneously with finishing the synchronization with the third speed, the sub clutch 64 is fully engaged, and the gearshift operation is finished. It is noted that in FIG. 6, the finish or the synchronization with the third speed and the full engagement of the sub clutch 64 are described separately in the columns so as to show comparison to the prior art. However, the finish of the synchronization with the third speed and the engagement of the sub clutch 64 occur simultaneously.

During the gearshift from the second to third speed, the main clutch 8 is engaged. The acceleration torque before the gearshift is the second speed torque, and the acceleration torque during and after the gearshift is the corresponding third speed torque transmitted by the sub clutch 64.

Figure 5:
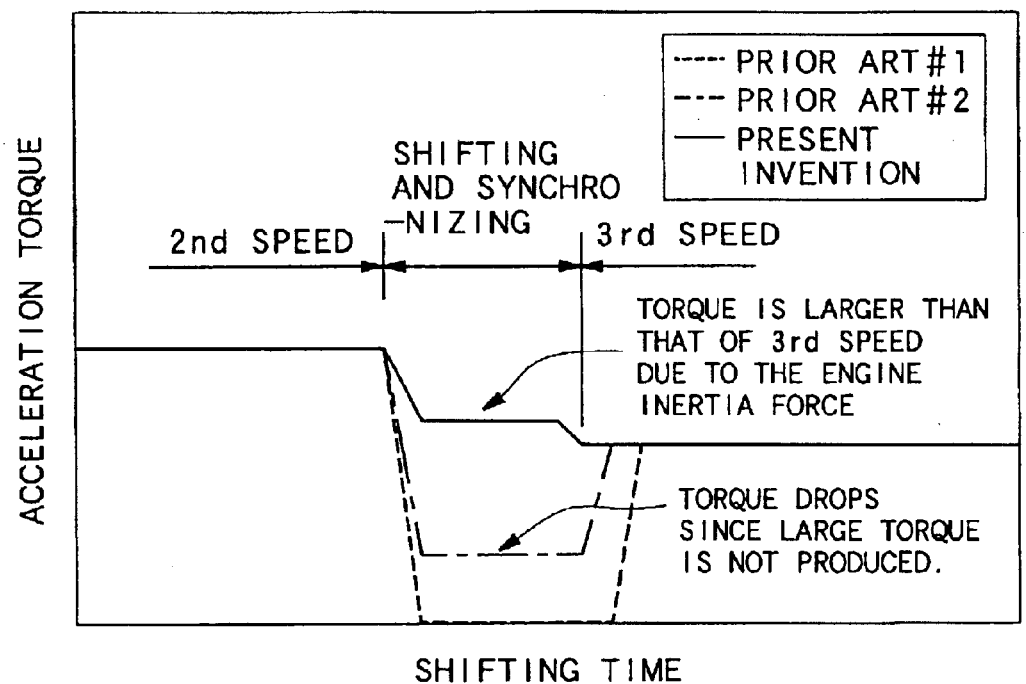
FIG. 5 is a timing chart during gearshift from second to third speed.

Accordingly, as shown by a solid line in FIG. 5, the sub clutch 64 maintains the acceleration torque corresponding to third speed during gearshift from second speed to third speed, to prevent a large decrease or fall-off of torque. The disconnection of the acceleration torque is eliminated to reduce shifting time, and the use of a separate third speed shift mechanism dedicated to the third speed gear train can be eliminated.

Figure 8:
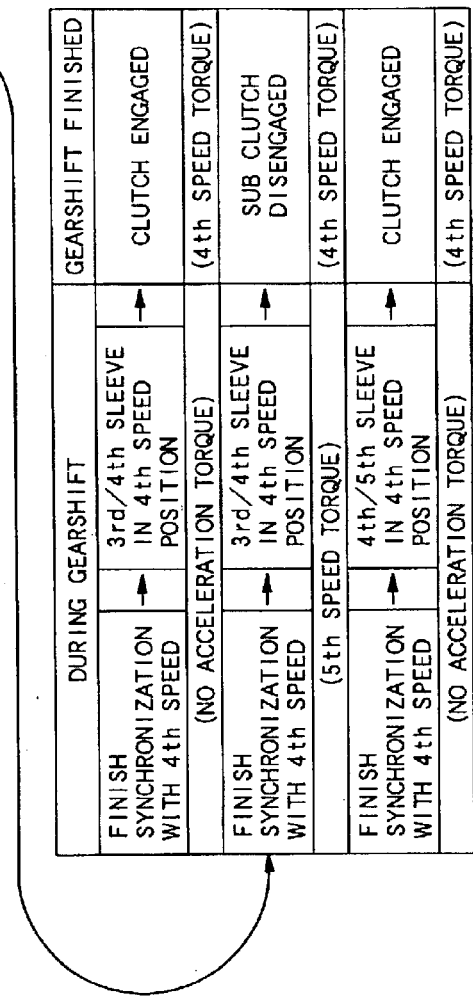
FIG. 8 is an explanatory drawing illustrating operations during gearshift from third to fourth speed.

FIG. 8 shows the gearshift from third to fourth speed. During operation in the third speed, before the gearshift during which the clutch 8 is engaged, the sub clutch 64 has been engaged. At the beginning of the gearshift, the main clutch 8 is disengaged to disconnect the torque transmitted from the engine 2 through the input shaft 18 to the output shaft 20. During the gearshift, the sub clutch 64 is disengaged and the 4th/5th shift sleeve 88 is moved from the neutral position and is pressed against the 4th engaging portion 90 of drive gear 48 to start synchronization. After finishing the synchronization with the fourth speed, the sleeve 88 is engaged with the 4th engaging portion 90 to shift the gear to the fourth speed, and the clutch 8 is engaged, and gearshift operation is finished.

In the gearshift from the third to fourth speed, the acceleration torque before the gearshift is the third speed torque due to the engagement of the clutch 8. The acceleration torque at the beginning of the gearshift and during the gearshift is zero due to the disengagement of the main clutch 8 and the sub clutch 64. The acceleration torque after finishing the gearshift is the fourth speed torque.

Figure 7:
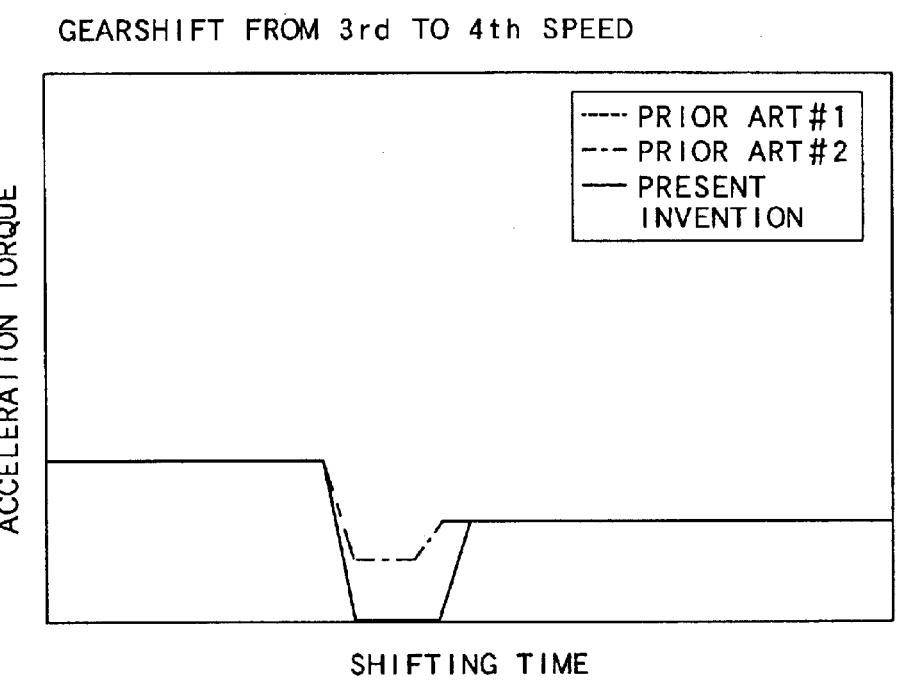
FIG. 7 is a timing chart during gearshift from third to fourth speed.

Accordingly, the acceleration torque in the automatic transmission 4 varies as shown by a solid line in FIG. 7. However, during the gearshift from the third to fourth speed, the decrease or drop of the acceleration torque is small and the shifting time is short, which does not give a detectable uncomfortable feeling during the gearshift.

FIG. 10 shows the gearshift from the fourth to fifth speed. During operation in the fourth speed before the gearshift in which the main clutch 8 is engaged, the 4th/5th shift sleeve 88 is engaged with the 4th engaging portion 90. At the beginning of the gearshift, the main clutch 8 is disengaged to disconnect the torque transmitted from the engine 2 through input shaft 18 to the output shaft 20. During the gearshift, the 4th/5th shift sleeve 88 is moved to the neutral position and is pressed against the 5th engaging portion 92 of drive gear 52 to start synchronization. After finishing the synchronization with the fifth speed, the shift sleeve 88 is engaged with the 5th engaging portion 92 to shift the gear to the fifth speed, and the main clutch 8 is engaged, and the gearshift operation is finished.

In the gearshift from the fourth to fifth speed, the acceleration torque before the gearshift is the fourth speed torque due to the engagement of the main clutch 8. The acceleration torque at the beginning of the gearshift and during the gearshift is zero due to the disengagement of the main clutch 8. The acceleration torque after finishing the gearshift is the fifth speed torque.

Figure 9:
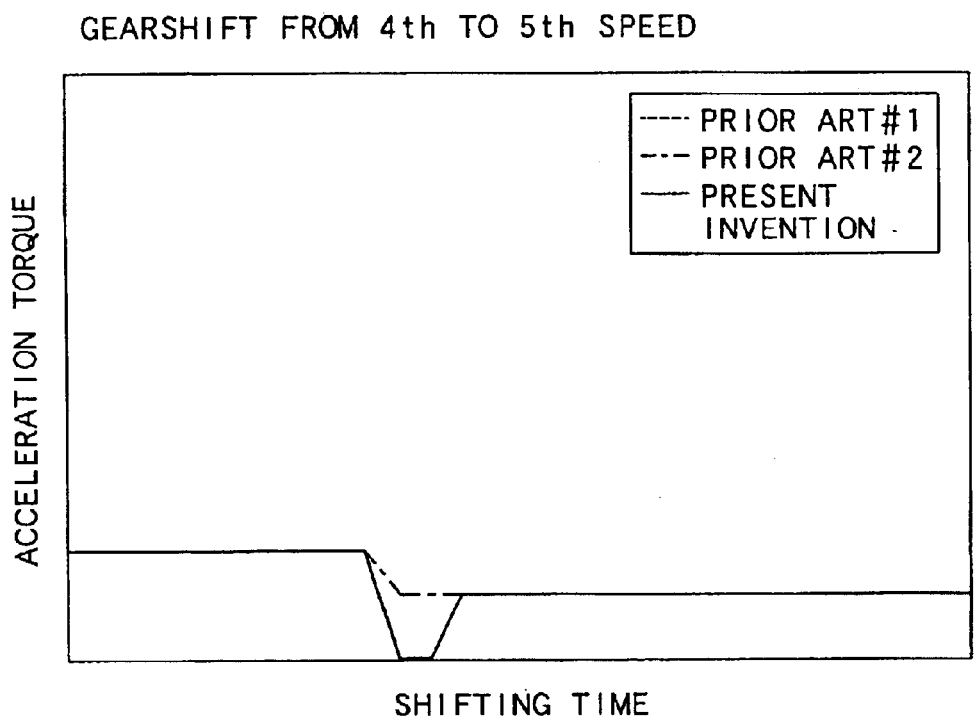
FIG. 9 is a timing chart during gearshift from fourth to fifth speed.

Accordingly, the acceleration torque in the automatic transmission 4 varies as shown by a solid line in FIG. 9. During the gearshift from the fourth to fifth speed, the drop of the acceleration torque is small and the shifting time is short, which does not give a detectable uncomfortable feeling during the gearshift.

As thus described, in the automatic transmission 4, the sub clutch 64 maintains the acceleration torque corresponding to third speed during gearshift from first to second speed and from second to third speed, to prevent a large decrease or fall-off of torque at the output shaft. The disconnection of the acceleration torque is eliminated, so as to reduce shifting time. Any additional third speed shift mechanism dedicated to the third speed gear train can also be eliminated.

As a result, the automatic transmission 4 prevents disconnection of the acceleration torque during gearshift from first to second speed and from second to third speed, which does not result in a detectable uncomfortable feeling during the gearshift. Shifting time to the third speed, which is frequently used, is shortened. The gearshift to the third speed and the gearshifting control is easily achieved. A select operation is eliminated during gearshift from second to third speed so that shifting time is reduced with respect to the gearshift using a shift lever having a letter "HI" pattern on a vehicle console.

Moreover, the automatic transmission 4 eliminates the third speed shift mechanism dedicated to the third speed gear train. This reduces weight due to a reduction in the number of components, and number of processes, thereby reducing cost. Additionally, during the gearshift from third to fourth speed and from fourth to fifth speed, the drop of the acceleration torque is small and the shifting time is short, which does not result in a detectable uncomfortable feeling during the gearshift.

On the other hand, FIG. 12 shows the gearshift from fourth to third speed by a kickdown (forced downshift). During operation in the fourth speed before the gearshift in which the main clutch 8 is engaged, the 4th/5th shift sleeve 88 is engaged with the 4th engaging portion of gear 48. At the beginning of the gearshift, the main clutch 8 is disengaged to disconnect the torque transmitted from the engine 2 through input shaft 18 to the output shaft 20. During the gearshift, the 4th/5th shift sleeve 88 is moved to the neutral position and the main clutch 8 is engaged. Synchronization with the third speed starts after starting of the engagement of the sub clutch 64. Simultaneously with finishing the synchronization with the third speed, the sub clutch 64 finishes engagement, and the gearshift operation is finished.

In the gearshift from the fourth to third speed by the kickdown, the acceleration torque before the gearshift is the fourth speed torque due to the engagement of the main clutch 8. The acceleration torque at the beginning of the gearshift and during the gearshift until the clutch 8 is engaged, is zero due to the disengagement of the clutch 8. The acceleration torque from the beginning of the sub clutch 64 engagement to the finishing of the gearshift is the third speed torque.

Figure 11:
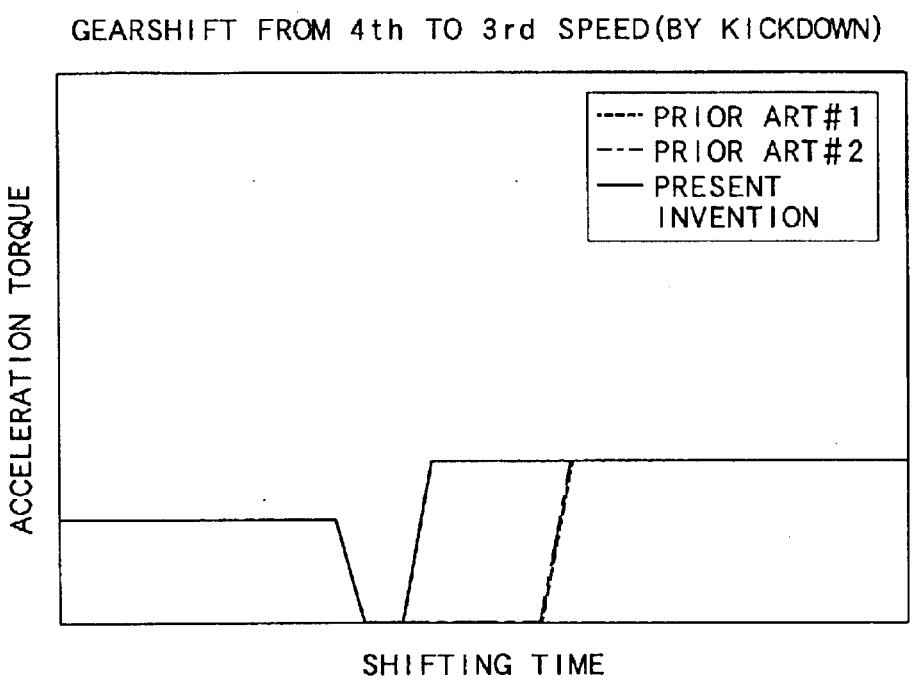
FIG. 11 is a timing chart during gearshift from fourth to third speed by kickdown.

Accordingly, as shown by a solid line in FIG. 11, during gearshift from fourth to third speed by kickdown, the acceleration torque can be maintained at third speed torque. Only the sub clutch 64 is engaged in third speed, so that the gearshift from fourth to third speed can be achieved quickly to reduce shifting time.

In addition, FIG. 14 shows the gearshift from fourth speed to second speed by kickdown. During operation in the fourth speed before the gearshift in which the main clutch 8 is engaged, the 4th/5th shift sleeve 88 is engaged with the 4th engaging portion 90 of gear 48. At the beginning of the gearshift, the main clutch 8 is disengaged to disconnect the torque transmitted from the engine 2 through input shaft 18 to the output shaft 20. During the gearshift, the 4th/5th shift sleeve 88 is moved to the neutral position and the main clutch 8 is engaged. Synchronization with the second speed starts after starting of the engagement of the sub clutch 64. When the synchronization with the second speed is finished, the shift sleeve 72 is engaged with the 2nd engaging portion 76 of gear 42 to achieve gearshift to the second speed, and then the sub clutch 64 is disengaged, and the gearshift operation is finished. The sub clutch 64 initially produces the third speed torque during kickdown shift from fourth to second speed. Quick shifting to the third speed is achievable as in the kickdown to the third speed, since engagement of only the sub clutch 64 realizes the shifting to the third speed. Then the sub clutch 64 is slidingly connected and, while transmitting the torque, adjusts to that the engine speed (input shaft rotating speed) and the output shaft rotating speed have rotating speeds corresponding to the second speed (i.e., synchronization with the second speed) to shift to the second speed. It is noted that this control of the engine speed can also be executed by control of throttle opening degree. If the control of the engine speed is executed while transmitting the torque, the engine speed is prevented from significant changes to make easier synchronization control.

In the gearshift from the fourth to second speed by the kickdown, the acceleration torque before the gearshift is the fourth speed torque due to the engagement of the main clutch 8. The acceleration torque at the beginning of the gearshift and during the gearshift until the clutch 8 is re-engaged, is zero due to the disengagement of the clutch 8. The acceleration torque at the beginning of engagement of the sub clutch 64 and before the engagement of the shift sleeve 72 with the 2nd engaging portion 76, is the third speed torque. When the gearshift is finished, the acceleration torque is the second speed torque.

Figure 13:
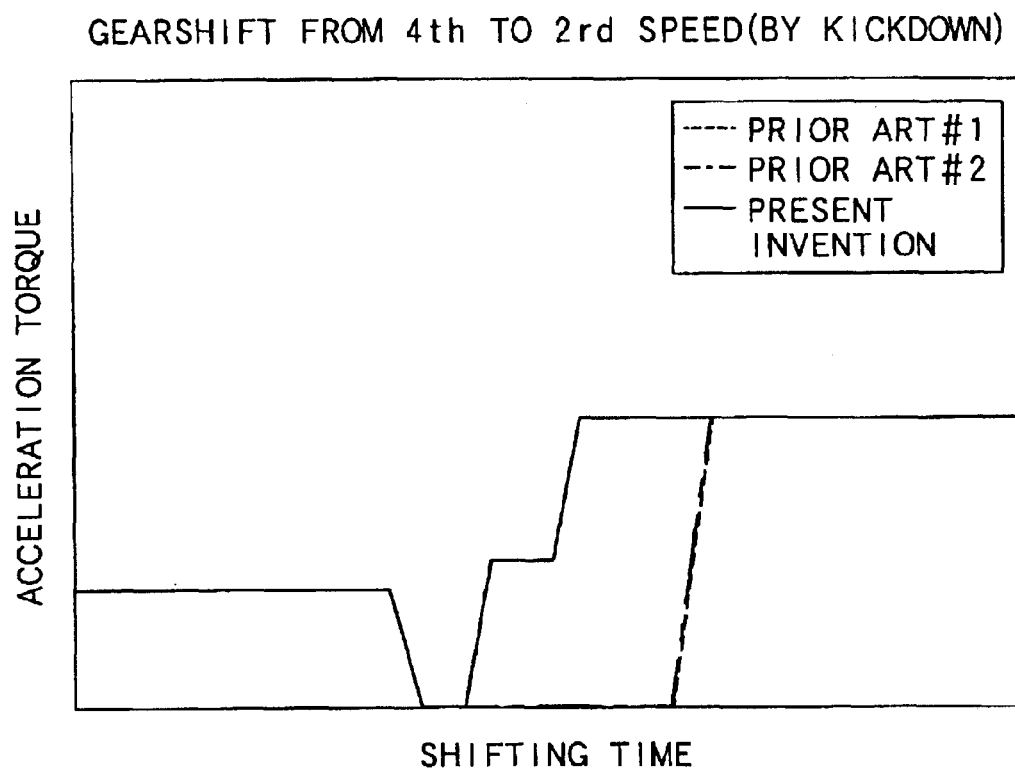
FIG. 13 is a timing chart during gearshift from fourth to second speed by kickdown.

Accordingly, as shown by a solid line in FIG. 13, during gearshift from fourth to second speed by kickdown, the acceleration torque can be maintained at third speed torque.

The automatic transmission 4 thus maintains the third speed acceleration torque during shift from fourth to third speed and from fourth to second speed by kickdown without a detectable uncomfortable feeling during continuous gearshift.

Figure 15:
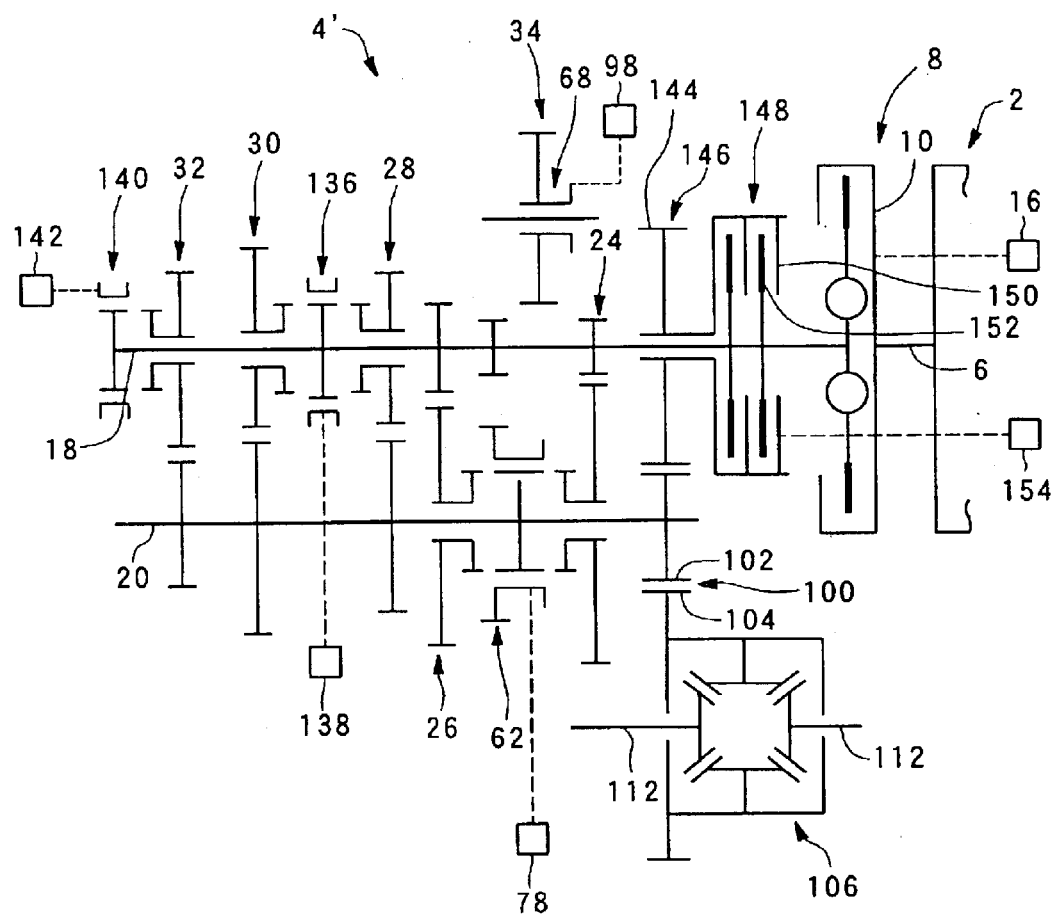
FIG. 15 is a schematic diagram of another embodiment of an automatic transmission according to the present invention.
Figure 16:
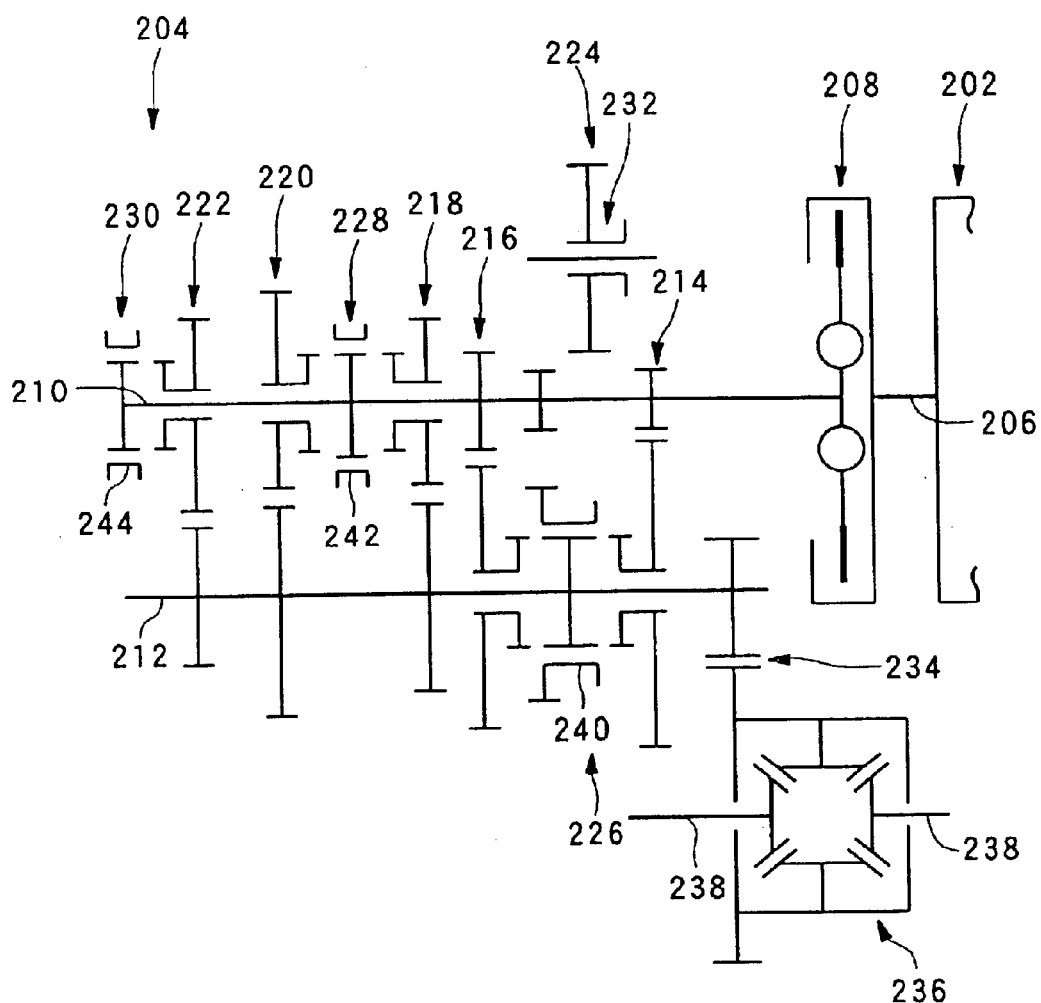
FIG. 16 is a schematic diagram of an example of a prior art automatic transmission.

FIG. 15 shows another embodiment of the invention. An automatic transmission 4' of this embodiment includes the clutch 8 between the crankshaft 6 of the engine 2 and the input shaft 18; the actuator for the clutch 16 to operate the clutch 8; the first speed gear train 24, the reverse gear train 34; and the second speed to fifth speed gear trains 26, 28, 30, 32.

In addition, the automatic transmission 4' includes the 1st/2nd speed shift mechanism 62 to shift between the first and second gear trains 24, 26; the actuator 78 to operate the shift mechanism 62; the reverse shift mechanism 68 to shift the reverse gear train 34; and the actuator 98 to operate the reverse shift mechanism 68. The automatic transmission 4' also includes a 3rd/4th speed shift mechanism 136 to shift between the third and fourth speed gear trains 28, 30; an actuator 138 to operate the shift mechanism 136; a 5th speed shift mechanism 140 to shift to the fifth speed gear trains 32; and an actuator 142 to operate the shift mechanism 140.

In the automatic transmission 4' of FIG. 15, the output shaft 20 has one end toward the engine 2 connected to the differential 106 through the final drive gear train 100. The drive shafts 112 have one end connected to the differential 106 and the other end connected to the drive wheels (not shown).

A communication gear 144 is rotatably supported by the input shaft 18 and in mesh with the final drive gear 102 defining the final drive gear train 100. A driving force transmitting path is defined between the input and output shafts 18, 20 where the communication gear 144 and the final drive gear 102 are formed. The driving force transmitting path includes a communication gear train 146 on which a sub or secondary clutch 148 is mounted. The sub clutch 148 includes a plurality of pressure plates 150 nonrotatably mounted on the communication gear 144 that is rotatably supported by the input shaft 18. A plurality of clutch disks 152 are nonrotatably mounted to the input shaft 18 alternately with the pressure plates 150. The sub clutch 148 has the clutch disks 152 abutted and released from the presser plates 150 by an actuator 154 for engagement and disengagement.

According to the automatic transmission 4' of this embodiment, the sub clutch 148 connects the communication gear train 146 during the gearshift from first to second speed, and from second to third speed, so that the acceleration torque to the output shaft is maintained at the gear transmission ratio of the communication gear train 146. The maintained torque prevents any large fall-off of the torque, and disconnection of the acceleration torque is eliminated so as to reduce shifting time.

Accordingly, the automatic transmission 4' of FIG. 15 prevents disconnection of the acceleration torque during gearshift from first to second speed, and from second to third speed, which does not give a detectable uncomfortable feeling during the gearshift. Also the select operation during gearshift from second to third speed is eliminated, so that shifting time is reduced with respect to a gearshift using a shift lever having a console defining an "H"-shaped pattern.

As thus described, in the automatic transmission of this invention, a sub or secondary clutch maintains the acceleration torque to the output shaft corresponding to third speed during gearshift to prevent a large fall-off of the torque. A disconnection of the acceleration torque is avoided and reduces shifting time. An additional third speed shift mechanism dedicated to the third speed gear train can also be eliminated.

As a result, the automatic transmission prevents disconnection of the acceleration torque during gearshift from first to second speed and from second to third speed, which does not give a detectable uncomfortable feeling during the gearshift. Shifting time to the third speed that is frequently used, is shortened. The gearshift to the third speed and gearshifting control is easily achieved. A select operation is eliminated during gearshifting from second to third speed so that shifting time is reduced with respect to a gearshift using a shift lever having an "H"-shaped shift pattern. In addition, elimination of the additional third speed shift mechanism dedicated to the third speed gear train reduces weight due to reduction in number of components, and number of processes, thereby reducing cost. Additionally, during the gearshift from the third to fourth speed and fourth to fifth speed, the drop of the acceleration torque is small and the shifting time is short, which does not give a detectable uncomfortable feeling during the gearshift. The automatic transmission also maintains the third speed acceleration torque during shift from fourth to third speed and from fourth to second speed by kickdown without a detectable uncomfortable feeling during continuous gearshift.

Although particular preferred embodiments of the invention has been disclosed in detail for illustrative purposes, it will be recognized that variations or modifications of the disclosed apparatus, including the rearrangement of parts, lie within the scope of the present invention.

What is claimed is:

1. An automatic transmission for a vehicle, the transmission including a main clutch connected and disconnected by a clutch actuator, an input shaft to receive driving force through said main clutch from an engine mounted on the vehicle, an output shaft in parallel with said input shaft for outputting the shifted driving force to drive wheels of the vehicle, a plurality of gear trains, to transmit the driving force of said input shaft at different ratios to said output shaft, a shift mechanism including a shift sleeve which shifts said gear trains, a shift actuator to operate said shift sleeve to shift said gear trains according to a driving state of the vehicle, and a sub clutch disposed on a driving force transmitting path between said input and output shafts to variably control the torque transmitted therethrough, said sub clutch transmitting the driving force from said input shaft to said output shaft during gearshift in which said shift sleeve is operated for shifting, comprising the improvement wherein said driving force transmitting path in which said sub clutch is disposed forms a third speed gear train that is the third gear ratio counted from a first speed gear train having a maximum speed ratio, and said sub clutch functions as a third speed shift mechanism for said third speed gear train.

2. The automatic transmission defined in claim 1, wherein the shift mechanism comprises a 1st/2nd shift mechanism to shift said first speed gear train to a second speed gear train, the first/second shift mechanism being disposed between said first speed gear train, which defines the maximum speed ratio, and said second speed gear train which is the second gear ratio counted from the first speed gear train having the maximum speed ratio, and wherein a 4th/5th shift mechanism to shift fourth and fifth speed gear trains is disposed between said fourth speed gear train, which is the fourth gear ratio, and said fifth speed gear train, which is the fifth gear ratio counted from the first speed gear train having the maximum speed ratio of said gear trains.

3. The automatic transmission defined in claim 2, wherein said sub clutch is disposed on said input shaft.

4. The automatic transmission defined in claim 1, wherein said sub clutch is disposed on said input shaft.

5. An automatic transmission for a vehicle, the transmission comprising:

an input shaft;

a main clutch connected and disconnected from said input shaft by a clutch actuator, said main clutch providing a driving force from an engine to said input shaft;

an output shaft in parallel with said input shaft for outputting the driving force to drive wheels of a vehicle;

a plurality of gear trains for transmitting the driving force from said input shaft at different ratios to said output shaft;

a first/second shift mechanism for shifting first and second speed gear trains of said plurality of gear trains; and a sub clutch disposed on a driving force transmitting path between said input and output shafts to variably control the torque transmitted therethrough, wherein the driving force transmitting path in which said sub clutch is disposed forms a third speed gear train that is the third gear ratio counted from the first speed gear train having a maximum speed ratio, so that said sub clutch functions as a third speed shift mechanism for said third speed gear train.

6. The automatic transmission defined in claim 5, further comprising a fourth/fifth shift mechanism for shifting fourth and fifth gear trains of said plurality of gear trains with said main clutch disconnected.

7. The automatic transmission defined in claim 6, wherein said sub clutch is disposed on said input shaft.

8. The automatic transmission defined in claim 5, wherein said sub clutch is disposed on said input shaft.

9. The automatic transmission defined in claim 5, wherein said main clutch remains connected during shifting from the second speed gear train to the third speed gear train.

10. The automatic transmission defined in claim 9, wherein said main clutch is disconnected during shifting from a fourth speed gear train to the second speed gear train.

11. The automatic transmission defined in claim 5, wherein said plurality of gear trains comprises five gear trains having different ratios for transmitting the driving force from said input shaft to said output shaft, wherein the fifth speed gear train has a minimum speed ratio.

12. The automatic transmission defined in claim 1, wherein said plurality of gear trains comprises five gear trains having different ratios for transmitting the driving force from said input shaft to said output shaft, wherein the fifth speed gear train has a minimum speed ratio.

13. The automatic transmission defined in claim 1, wherein said sub clutch variably controls the acceleration torque transmitted between the input shaft and the output shaft during shifting from the first speed gear train to a second speed gear train.

14. The automatic transmission defined in claim 5, wherein said sub clutch variably controls the acceleration torque transmitted between the input shaft and the output shaft during shifting from the first speed gear train to the second speed gear train.

* * * * *